United States Patent
Donovan et al.

(10) Patent No.: US 10,569,470 B2
(45) Date of Patent: Feb. 25, 2020

(54) AGENT CALIBRATION

(71) Applicant: Hewlett-Packard Development Company, L.P., Houston, TX (US)

(72) Inventors: David H Donovan, San Diego, CA (US); Jacob T Wright, San Diego, CA (US); Erica Montei Fung, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 229 days.

(21) Appl. No.: 15/544,826

(22) PCT Filed: Jan. 30, 2015

(86) PCT No.: PCT/US2015/013967
§ 371 (c)(1),
(2) Date: Jul. 19, 2017

(87) PCT Pub. No.: WO2016/122660
PCT Pub. Date: Aug. 4, 2016

(65) Prior Publication Data
US 2018/0009171 A1    Jan. 11, 2018

(51) Int. Cl.
*B29C 64/393* (2017.01)
*B33Y 50/02* (2015.01)
*B29C 64/112* (2017.01)
*B29C 64/386* (2017.01)
*H04N 1/60* (2006.01)

(52) U.S. Cl.
CPC .......... *B29C 64/393* (2017.08); *B29C 64/112* (2017.08); *B29C 64/386* (2017.08); *B33Y 50/02* (2014.12); *H04N 1/60* (2013.01)

(58) Field of Classification Search
CPC ... B29C 64/393; B29C 64/112; B29C 64/386; B33Y 50/02; H04N 1/60
See application file for complete search history.

(56) References Cited

U.S. PATENT DOCUMENTS

| | | | |
|---|---|---|---|
| 4,204,124 | A | 5/1980 | Kowalski |
| 6,162,576 | A | 12/2000 | Hagiwara et al. |
| 8,237,788 | B2 | 8/2012 | Cooper et al. |
| 9,841,750 | B2* | 12/2017 | Willis ................ G05B 19/4099 |
| 2006/0180957 | A1 | 8/2006 | Hopkinson et al. |

(Continued)

FOREIGN PATENT DOCUMENTS

| | | |
|---|---|---|
| EP | 1648686 | 12/2009 |
| JP | 2004074800 | 3/2004 |
| WO | WO2008075450 | 6/2008 |

OTHER PUBLICATIONS

Kim, Jung-Su, et al., "3D Printing Method of Multi Piezo Head using a Photopolymer Resin", Intl. Conf. on Control, Automation and Systems 2007, 4 pgs.

(Continued)

*Primary Examiner* — Bryan Bui
(74) *Attorney, Agent, or Firm* — HP Inc. Patent Department

(57) ABSTRACT

Agent calibration can, in an example implementation, include generating a calibration based on a quantity of energy absorbed by a build material treated with different quantities of an agent and converting a portion of a three-dimensional object model to a quantity of agent based on the calibration.

12 Claims, 4 Drawing Sheets

(56) References Cited

U.S. PATENT DOCUMENTS

| | | |
|---|---|---|
| 2007/0241482 A1 | 10/2007 | Giller et al. |
| 2009/0051935 A1 | 2/2009 | Cooper |
| 2014/0314613 A1 | 10/2014 | Hopkinson et al. |
| 2016/0332384 A1* | 11/2016 | De Pena ................ B33Y 30/00 |

OTHER PUBLICATIONS

International Search Report and Written Opinion for International Application No. PCT/US2015/013967 dated Sep. 23, 2015, 9 pages.

* cited by examiner

AGENT CALIBRATION

BACKGROUND

Additive manufacturing systems can manufacture three-dimensional (3-D) objects by utilizing a mechanism of successively depositing a material to build up a three-dimensional (3-D) object. The additive manufacturing mechanism can include depositing printing agents onto a build material to effect the build up of the 3-D object. 3-D printers can utilize such a mechanism to additively manufacture 3-D objects. 3-D printed objects can be additively manufactured based on a three-dimensional object model.

DETAILED DESCRIPTION

Figure 1:
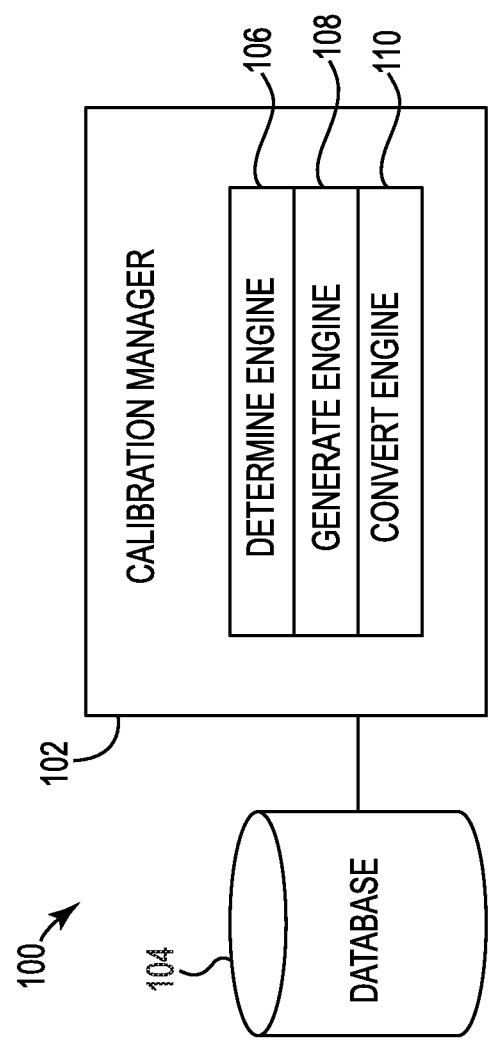
FIG. 1 illustrates a diagram of an example of agent calibration according to the present disclosure.

Additive manufacturing techniques including three-dimensional (3-D) printing have gained acceptance for the ability to rapidly produce high-quality parts from computer-aided design (CAD) specifications, scans of a 3-D object, computer generate objects, etc. Improved additive manufacturing techniques enable the production of increasingly sophisticated objects.

Additive manufacturing devices (e.g., 3-D printers) can operate utilizing a variety of mechanisms. For example, an additive manufacturing device can operate by spreading a layer of a material on a build area (e.g., a portion of a bed of a 3-D printer upon which 3-D objects are additively manufactured). The material can be a build material (e.g., a thermoplastic powder).

The additive manufacturing device can apply a printing agent to the build material. As used herein, a printing agent can be an agent (e.g., a composition of matter in a solid, liquid, gas, gel, colloid, etc. form that produces an effect in the additive manufacturing process) that is printable and/or printed by an additive manufacturing device. An agent that is printable can include an agent that can be delivered through an agent delivery mechanism of an additive manufacturing device. For example, a printing agent can be ejected from a printing agent dispensing nozzle within a nozzle array of a 3-D printing device.

A printing agent can be an agent that modulates energy absorption by a second material and/or transforms the properties of a second material. The second material can be a build material. The build material can be a material that can be transformed into the 3-D object.

The build material can be, for example, a thermoplastic powder, which can melt and then solidify. For example, the printing agent can include a fusing agent that acts as an energy absorber to transfer an increased quantity of applied energy to the second material relative to untreated build material. In an example, the fusing agent can be a liquid material that absorbs radiation applied by an energy source of the additive manufacturing device (e.g., absorbs particular wavelengths of radiation applied from a lamp, which can be within and/or outside of the visible spectrum). The fusing agent can, in an example, be a dark colored (e.g., black) thermal absorber and/or a colorless thermal absorber (e.g., Ultraviolet (UV) absorbers). The printing agent can also include energy absorption retarding printing agents and/or a moderating printing agent that modifies a degree of coalescence of the build material.

The printing agent can be selectively applied to portions of the build material within the build area. The printing agent can cause those portions to selectively solidify or to remain in their original state.

A printing agent can be dispensed via a printing agent nozzle. The printing agent nozzle can be one of a plurality of nozzles utilized in the additive manufacturing device. For example, the nozzle can be a nozzle situated in an array of nozzles within a printhead. The nozzle array can be of various sizes such as a building area-wide nozzle array where particular groups of nozzles are utilized to deposit printing agent in particular portions of the build area.

The additive manufacturing device can solidify portions of the build material by applying energy to the material. For example, the device can apply energy to the build material powder in order to cause the powder to solidify (e.g., to heat up, to coalesce, and to cool into a solid material). The energy can be applied from a heat source. For example, the energy can be applied by a lamp (e.g., an overhead lamp, an array of near infrared lamps, an array of near infrared lamps situated above the build area).

The energy applied by the lamps can be selectively absorbed by portions of the build material. For example, the portions of the build material treated with the printing agent (e.g., portions of the printing agent upon which agent has been deposited) can, by virtue of the energy absorptive properties of the agent and/or other agent properties, absorb comparatively more of the applied energy than other material. The areas of build material treated with the printing agent can reach a temperature (e.g., a melting point) causing the material to melt in order to eventually coalesce and/or solidify. The additive manufacturing device can index (e.g., move in a z-axis where the x-axis corresponds to a first dimension, a y-axis corresponds to a second dimension, and the z-axis corresponds to a third dimension) and spread a new layer of build material and repeat the process, building a 3-D object one layer at a time.

The quantity of energy absorbed by a build material treated with a printing agent can have distinctly non-linear absorption behavior versus the amount of printing agent applied. This non-linear behavior can render control and modulation of energy absorbed by the build material during manufacture of the 3-D object difficult.

An additive manufacturing process can be influenced by a number of variables. The variables can be non-uniform and device-dependent. With non-uniformity among the variables, the quality and consistency of the manufactured 3-D objects can degrade. For example, the variables can include the drop weight of the nozzles ejecting the printing agent, the printing agent viscosity, the absorbing material concentration in an energy absorbing printing agent, the spatial variation of the energy source used (e.g., the non-uniform physical properties of lamps used to apply energy to the build material, the non-uniform spacing and/or placement of the lamps in an array, the non-uniform effect of a temperature control system, etc.), spatial variation in energy absorption efficiency, etc.

The failure to achieve uniformity among these variables and/or uniformity of energy delivered and/or absorbed by portions of the build material can result in a 3-D object not being additively manufactured as intended. The defects can include too much coalesced and solidified build material, not enough coalesced and solidified build material, improper density of coalesced and solidified build material, an incorrect degree of calescence and/or solidification, etc. Non-uniformity in energy delivery can result in part warpage, poor object qualities, poor surface properties of the object, poor accuracy, poor object strength, poor inter-layer bonding, etc. These defects can render an additive manufacturing device unsuitable for creating particular 3-D objects, it can limit the resolution of the device, and it can add time and materials to the additive manufacturing process.

Selective Laser Sintering (SLS) systems have attempted to homogenize temperatures across the build surface of an additive manufacturing device by utilizing an oven. The oven adds significant cost the additive manufacturing device and makes the design of electromechanical assemblies that cannot withstand high heat (e.g., motors, etc.) difficult. SLS systems also utilize a comparatively long stabilization time, prior to building objects, for the system to reach a near-equilibrium state.

Unlike the expensive and unwieldy homogeneity SLS systems, the present disclosure describes a system, method, and computer readable medium of printing agent calibration. For example, printing agent calibration can include calibrating an additive manufacturing system for variability among the drop weight of the nozzles ejecting the printing agent, the printing agent viscosity, the absorbing material concentration in an energy absorbing printing agent, the spatial variation of the energy source used, spatial variation in energy absorption efficiency, etc. In doing so, printing agent calibration can make the additive manufacturing system behave more predictably and remove variability from additive 3-D object manufacturing process leading to more accurate and consistent additively manufactured 3-D objects. For example, the agent calibration can include determining a quantity of energy absorbed by a build material treated with a plurality of different quantities of a printing agent at a location of a build area, generating a calibration based on the determined quantity of energy, and converting a portion of a 3-D object model corresponding to the location, to a calibrated quantity of printing agent with which to treat the location to additively manufacture the portion of the three-dimensional 3-D object model based on the calibration.

The energy delivery of an additive manufacturing system can be calibrated based on direct and/or indirect measurements of energy applied by the device and/or absorbed by a material (e.g., thermoplastic build powder) at a location of the build area treated with different quantities of printing agent. The different quantities of printing agent can be different quantities of fusing agent. A fusing agent can be a thermal absorber energy absorbing material that promotes coalescence and solidification of the build material.

For example, a fusing agent can be a printing agent that contains at least two main components: an energy absorbing material and water. An energy absorbing material can be carbon black and/or any wide-band absorber of visible and/or infrared (IR) wavelengths. Water can have a comparatively large enthalpy of vaporization and a comparatively high specific heat capacity. Evaporating the water in the fusing agent can contribute twenty percent or more to the total energy budget to melt a build material component such as nylon. The printing agent can be limited to absorbing as much energy as is being applied into the system (e.g., from the lamps). Therefore, the energy absorbed by the build material can asymptote at a particular printing agent-to-build material area value. The water to be evaporated from the printing agent during coalescence and solidification of the build material can scale linearly with the quantity of printing agent applied regardless of a quantity of energy absorption.

Combining an energy absorbing function and an energy loss function together, a function curve with a peak in it can be generated. The peak can represent the peak energy absorption for a quantity of printing agent quantity for a location. The area of the curve to the left of such a peak can indicate a quantity of printing agent insufficient to absorb all the available energy in the system. The area of the curve to the right of the peak can indicate a saturation of energy absorption by the build material where treatment with additional printing agent will serve increase the amount of water to evaporate, thereby reducing the net energy imparted into the build material. The effect of adding additional printing agent to a location can be distinct depending which part of the curve the addition falls within. The effect can, without knowledge of the position on the curve, be opposite from the intended effect. For example, applying additional printing agent in a location where the available energy absorption has been saturated in an attempt to increase energy absorption at the location can actually cause energy absorption to decrease at the location due to the energy loss of evaporating the additional water of the added printing agent without a concordant increase in net energy absorption. Agent calibration can include calibrating the quantity of a printing agent with which to treat portions of a build area to produce a uniform quantity of energy absorption by the build material across the build area.

FIG. 1 illustrates a diagram of an example of a system 100 for agent calibration according to the present disclosure. The system 100 can include a database 104, a calibration manager 102, and/or a number of engines (e.g., determine engine 106, generate engine 108, convert engine 110). The calibration manager 102 can be in communication with the database 104 via a communication link, and can include the number of engines (e.g., determine engine 106, generate engine 108, convert engine 110). The calibration manager 102 can include additional or fewer engines than are illustrated to perform the various functions as will be described in further detail.

The number of engines (e.g., determine engine 106, generate engine 108, convert engine 110) can include a combination of hardware and programming, but at least hardware, that is to perform functions described herein (e.g., determine a quantity of energy absorbed by a build material treated with a plurality of different quantities of a printing agent at a location of a build area; generate a calibration based on the determined quantity of energy; convert a portion of a three-dimensional (3-D) object model corresponding to the location, to a calibrated quantity of printing agent with which to treat the location to additively manufacture the portion of the three-dimensional (3-D) object model based on the calibration, etc.). The programming can include program instructions (e.g., software, firmware, etc.) stored in a memory resource (e.g., computer readable medium, machine readable medium, etc.) as well as hard-wired programs (e.g., logic).

The determine engine 106 can include hardware and/or a combination of hardware and programming, but at least hardware, to determine a quantity of energy absorbed by a build material treated with a plurality of different quantities of a printing agent(s) at a location of a build area. Determining the energy absorbed by a build material treated with a quantity of printing agent(s) can be accomplished by performing direct and/or indirect measurements of energy absorption at each location for each quantity of applied printing agent(s). The measurements can be collected by energy absorption measurement mechanisms. The energy absorption measurement mechanisms can include sensors such as an infrared (IR) camera, scanning IR temperature sensor, a radiation sensor, a reflectometer, densitometer, colorimeter, digital camera, gloss meter, haze meter, phototransistor, photodiode, light-to-voltage converter integrated circuit, contact image sensor, charged coupled device, etc. The energy absorption measurement mechanisms can be integral to the additive manufacturing device, ancillary to the additive manufacturing device, and/or separate from the additive manufacturing device. The energy absorption measurement mechanisms can measure properties of the additive manufacturing device, properties of portions of the build area of the additive manufacturing device, properties of the build material upon portions of the build area of the additive manufacturing device, properties of applied printing agent(s), properties of printing agent(s) application, properties of a 3-D object additively manufactured at portions of the build area of the additive manufacturing device, etc. The energy absorbed by a build material treated with a quantity of printing agent(s) can be a function of the measured properties.

The generate engine 108 can include hardware and/or a combination of hardware and programming, but at least hardware, to generate a calibration based on the determined quantity of energy. The calibration can be a table and/or mathematical function relating quantities of applied printing agent(s) to the energy absorbed by a build material. The calibration can be applicable to the entire build area and/or a portion of the build area being analyzed.

Generating a calibration can include determining a particular quantity of printing agent(s) per area of the build material that corresponds to a targeted quantity of energy (e.g., a virtual quantity of energy that can be the target quantity value or relative quantity (highest quantity, lowest quantity, etc.) for energy absorption by an area of build material) absorbed by the area of build material. An additive manufacturing system can apply a particular quantity of energy to the build material treated with the printing agent(s). The particular quantity of deliverable energy for the system can be limited by the maximum output of the energy source (e.g., lamps, temperature control systems, etc.). As described above, treating an area of the build material with printing agent(s) (e.g., fusing agents) can affect the absorption of the available energy by the area of build material. The effect on energy absorption can vary with the quantity of printing agent(s) applied to the area of build material. Determining a particular quantity of printing agent(s) per area of build material that results in a targeted quantity of energy absorbed by that area of build material can include determining the quantity of printing agent(s) that, when applied to that area of build material at that portion of the build area, results in a peak energy absorption for that area. The peak energy absorption can be a maximal amount of energy absorption at an area treated with a plurality of different quantities of printing agent(s). The peak energy absorption can be utilized as the peak energy absorption value in construction of a calibration curve. The peak energy absorption value in the calibration curve can be a printing agent(s) quantity for the location past which application of further printing agent(s) results in an identical and/or decreased energy absorption for the location and before which application of further printing agent(s) results in increased energy absorption for the location.

The calibration curve can be a curve constructed from determined quantities of energy absorbed by a build material treated with a plurality of different quantities of a printing agent(s) such as a fusing agent. The determined quantities can include a peak energy absorption value. The calibration can be constructed by interpolation of a curve fit to approximately equidistant measurement values of energy absorption for an area of build material treated with quantities of a printing agent(s). The equidistant measurements can be measurements between a zero quantity of applied printing agent(s) and a particular quantity of applied printing agent(s) corresponding to the peak energy absorption value. That is, the calibration curve can be constructed by interpolating a curve from selected approximately equidistant measurement values from the measurements of energy absorption at each quantity of applied printing agent(s) within a range of applied printing agent(s) quantities between zero printing agent(s) and the quantity of printing agent(s) corresponding to the maximal amount of energy absorption for the location. Such a calibration curve can describe a quantity of printing agent(s) corresponding to each quantity of energy absorption for an area of build material.

The calibration can also include a calibration table. A calibration table can characterize a calibrated quantity of printing agent(s) (e.g., the amount of fusing agent calibrated for a specific additive manufacturing device to produce a targeted outcome, such as a quantity of energy absorption at a location of the build area of the device) per an area of build material to produce a quantity of energy absorption at the location. The calibration table can be constructed based on the curve interpolated from the determined quantity of energy absorbed by the build material treated with various quantities of the plurality of quantities of printing agent(s) between zero printing agent(s) and the particular quantity of printing agent(s). The calibration table can be a lookup table describing a quantity of printing agent(s) (e.g., fusing agent) that, when applied to build material upon the build area, corresponds to each quantity of energy absorption for the particular area. That is, the calibration table can include calibrated quantities of printing agent(s) per area of build material that will result in a particular quantity of energy absorption for the area of build material. The calibrated quantity of printing agent(s) for each of a plurality of locations of a build area can be normalized quantities of printing agent(s) and/or can be adjusted to achieve a uniform absorption of energy across the build area. For example, two locations of build material upon the build area that are designated (e.g., by a 3-D object model) to absorb the same amount of applied energy can experience spatial variation in printing agent(s) drop weight and/or spatial variation in energy applied to the area. This non-uniformity can be corrected by applying an adjustment to correct for the variation between the locations. Therefore, the calibration table can include the adjusted and/or calibrated quantity of printing agent(s) that, when applied to an area of build material at a location of the build area, will result in a quantity of energy absorption at the location, for each of a number of quantities of printing agent(s). The calibration table can be utilized by looking up an incoming designated energy absorption value (e.g., by a 3-D object model) for a location and identifying the corresponding adjusted and/or calibrated quantity of printing agent(s) that, when applied to that area will affect the designated quantity of energy absorption.

The system 100 can additionally include an assign engine to assign a modeled energy quantity to a portion of the 3-D object model. The 3-D object model can be made up of elements. The elements can be addressable locations (e.g., a pixel, a voxel, etc.) of the 3-D object model. The elements can correspond to locations of the build area of an additive manufacturing device. The element can include indications of the solid geometry of a 3-D object being modeled at each addressable location of the 3-D object model. In order to additively manufacture the solid geometry of the 3-D object specified at each addressable location of the 3-D object model build material at the corresponding location of the build area can be coalesced and/or solidified. In order to coalesce and or solidify, the build material can absorb a quantity of applied energy. The quantity of energy absorption to coalesce and or solidify the material and manufacture the geometry can be modeled based on the 3-D object model. That is, each element of the 3-D object model can be converted to a modeled energy quantity. The modeled energy quantity can be a determined quantity of energy that when absorbed by a build material in a location of the build area can produce the solid geometry of the 3-D object specified in the corresponding element of the 3-D object model. Therefore, the 3-D object model can be converted to a 3-D object model energy map specifying, at each addressable location of the 3-D object model, a targeted quantity of energy to be absorbed by the build material at the location in order to manufacture the solid geometry of the 3-D object. That is, the 3-D object model can specify the physical dimensions (e.g., height, width, length, weight, density, surface properties, etc.) of a 3-D object and the assign engine can assign a quantity of energy to be absorbed by the build material at each location of the build area to additively manufacture a 3-D object with those dimensions. The calibration manager 102 can include the assign engine or the assign engine can be distinct from the calibration engine 102 partially or entirely.

The convert engine 110 can include hardware and/or a combination of hardware and programming, but at least hardware, to convert a portion of a 3-D object model corresponding to a location, to a calibrated quantity of printing agent(s) with which to treat the location to additively manufacture the portion of the 3-D object model based on the calibration. The portion of the 3-D object model can be a modeled energy quantity converted from an element of the 3-D object model. For example, an addressable location of a 3-D object model can be converted to a modeled energy quantity describing a target quantity of energy to be delivered and/or absorbed by a build material at the location, which can be converted to a calibrated quantity of printing agent(s). The modeled energy quantity to be delivered and/or absorbed by a build material at the location can be converted to a calibrated quantity of printing agent(s) by applying the calibration to the modeled energy value.

For example, an inverse function derived from the calibration curve can be fit into an algebraic function such as a polynomial to generate a calibration function. A polynomial calibrating function can be applied to the modeled energy quantity associated with the portion of the 3-D object model energy map.

In an example, the system can comprise a 3-D printing device. For example, a 3-D printer can cause to be executed and/or execute a number of engines (e.g., determine engine 106, generate engine 108, convert engine 110). The 3-D printing device can execute the system 100 can execute the system utilizing integral, ancillary, and/or separate software, hardware, firmware, and/or logic to perform functions described herein.

Figure 2:
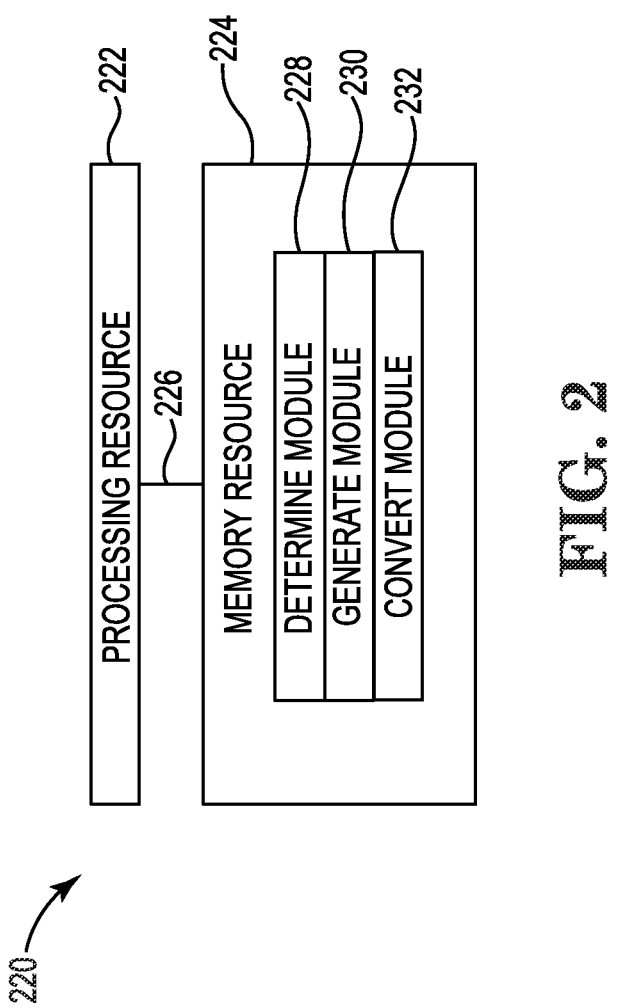
FIG. 2 illustrates a diagram of an example of a computing device according to the present disclosure.

FIG. 2 illustrates a diagram of an example of a computing device 220 according to the present disclosure. The computing device 220 can utilize software, hardware, firmware, and/or logic to perform functions described herein.

The computing device 220 can be any combination of hardware and program instructions to share information. The hardware, for example, can include a processing resource 222 and/or a memory resource 224 (e.g., non-transitory computer-readable medium (CRM), machine readable medium (MRM), database, etc.). A processing resource 222, as used herein, can include any number of processors capable of executing instructions stored by a memory resource 224. Processing resource 222 can be implemented in a single device or distributed across multiple devices. The program instructions (e.g., computer readable instructions (CRI)) can include instructions stored on the memory resource 224 and executable by the processing resource 222 to implement a desired function (e.g., determine, for a build area of a three-dimensional printer, a relationship between a quantity of energy absorbed by an area of build material and a quantity of a printing agent (e.g., fusing agent, etc.) treating the area of build material; generate a calibration to convert a modeled quantity of energy to a calibrated quantity of printing agent based on the relationship; convert, based on the calibration, a plurality of modeled energy quantities represented in a three-dimensional object model into corresponding quantities of printing agent to be applied to the build area; etc.).

The memory resource 224 can be in communication with the processing resource 222 via a communication link (e.g., a path) 226. The communication link 226 can be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A number of modules (e.g., determine module 228, generate module 230, convert module 232, etc.) can include CRI that when executed by the processing resource 222 can perform functions. The number of modules (e.g., determine module 228, generate module 230, convert module 232, etc.) can be sub-modules of other modules. For example, the determine module 228 and the generate module 230 can be sub-modules and/or contained within the same device. In another example, the number of modules (e.g., determine module 228, generate module 230, convert module 232, etc.) can comprise individual modules at separate and distinct locations (e.g., CRM, etc.).

Each of the number of modules (e.g., determine module 228, generate module 230, convert module 232, etc.) can include instructions that when executed by the processing resource 222 can function as a corresponding engine as described herein. For example, the determine module 228, generate module 230, and convert module 232 can include instructions that when executed by the processing resource 222 can function as the determine engine 106, the generate engine 108, and the convert engine 110, respectively.

The determine module 228 can include CRI that when executed by the processing resource 222 can determine, for a build area of a three-dimensional printer, a relationship between a quantity of energy absorbed by an area of build material and a quantity of a printing agent(s) (e.g., fusing agent, etc.) treating the area of build material. Determining a relationship between a quantity of energy absorbed by an area of build material and a quantity of a printing agent(s) treating the area of build material can include determining the quantity of energy absorbed for a variety of quantities of printing agent(s) treating an area of build material. The relationship between the quantity of printing agent(s) applied to an area and the quantity of energy absorbed at that area can be used to construct a calibration curve.

The generate module 230 can include CRI that when executed by the processing resource 222 can generate a calibration to convert a modeled quantity of energy to a calibrated quantity of printing agent(s) based on the relationship. Generating a calibration can include constructing the calibration curve based on the determined relationship. The calibration can be an adjustment applicable to a modeled quantity of energy to generate a calibrated quantity of printing agent(s) to be applied to a portion of a build area. The calibration can also adjust the modeled quantity of printing agent(s) to be applied to a portion of the build area to correct for spatial variation in the quantity of energy absorbed by the area of build material in that portion of the build area and/or spatial variation in the quantity of delivered printing agent(s) in that portion of the build area. Spatial energy variation can include: variations in the quantity of energy delivered to build material, variations in the quantity of energy absorbed by build material, and/or the quantity of printing agent(s) delivered across addressable portions of the build area.

The spatial variation in the quantity of energy absorbed by the area of build material can be identified based on a measurement of temperature variation across portions of the build area. The spatial variation in the quantity of energy absorbed by the area of build material can also be identified based on a measurement of physical property variation among test objects across portions of the build area. The spatial variation in the quantity of energy absorbed by the area of build material can also be a spatial variation in the quantity of delivered printing agent(s) across portions of the build area. The spatial variation in the quantity of delivered printing agent(s) in that portion of the build area can be determined by measuring a drop weight variation across portions of the build area.

The convert module 232 can include CRI that when executed by the processing resource 222 can convert, based on the calibration, a plurality of modeled energy quantities represented in a three-dimensional object model into corresponding quantities of printing agent(s) to be applied to the build area. Converting the plurality of modeled energy quantities represented in a 3-D object model (e.g., 3-D object model energy map) to corresponding quantities of printing agent(s) to be applied to the build area can be accomplished by applying the generated calibration and/or additional corrections to the modeled energy quantities to determine quantities of printing agent(s) to be applied to the build area to effect the targeted amount of energy absorption leading to manufacture of corresponding portions of the 3-D object.

Figure 3:
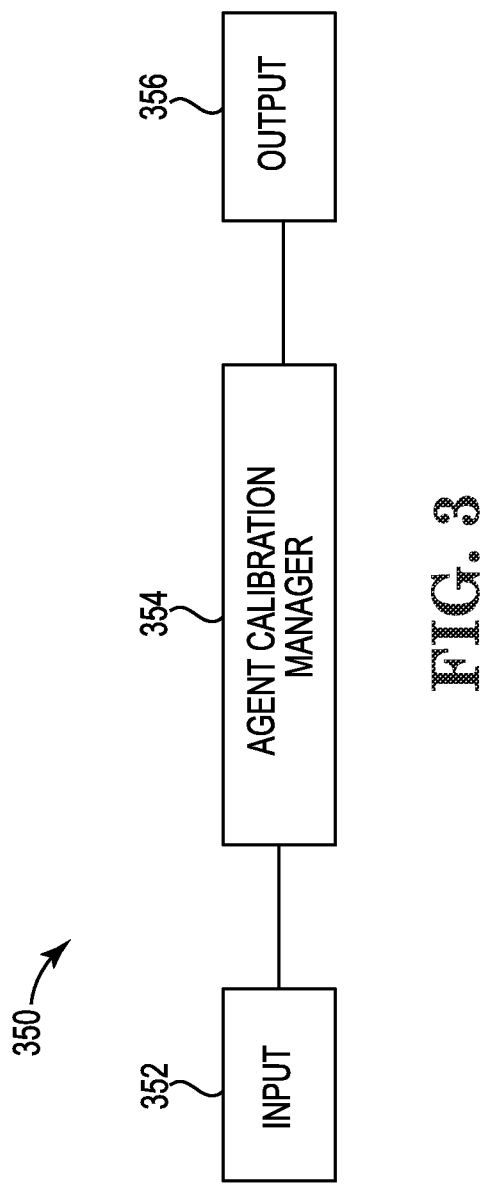
FIG. 3 illustrates an example of an environment suitable for agent calibration according to the present disclosure.

FIG. 3 illustrates an example environment 350 suitable for printing agent calibration according to the present disclosure. The environment 350 is shown to include an input 352, an agent calibration manager 354, and an output 356.

The environment 350 can include an input 352. The input 352 can include data representing a 3-D object to be built in a suitable data format. An input 352 can include a 3-D object model. The 3-D object model can be a model of a 3-D target structure to additively manufacture. That is, the 3-D model can be a graphical and/or mathematical representation of a 3-D object to be created via additive manufacturing. The 3-D object model can represent a map of the solid geometry of the 3-D object. The input 352 can be the entire 3-D object or a portion of the entire 3-D object to be additively manufactured. The 3-D object map can be constructed of a series of elements representing addressable locations of a build area. The addressable location can be a location of the build area corresponding to a voxel in a layer of a 3-D object model. For example, the addressable location can be a location of a build area where a voxel of the 3-D object model will be created. A layer of a 3-D object map can include a portion of the 3-D object map corresponding to a single iteration of the additive manufacturing process. That is a layer of a 3-D object map can correspond to all of the elements of the 3-D object that will be manufactured before indexing and laying down more build material.

As used herein, a voxel can refer to a smallest addressable location of a 3-D object addressable by an additive manufacturing device. In some examples, a voxel can be two hundredths of a millimeter square or smaller. The voxel can correspond to a point on a 3-D object computer-aided design model or a conversion thereof to a compatible format. A voxel can include a highest resolution point, as described herein, where an additive manufacturing device can place a material.

The addressable location can be a location of the build area corresponding to a region of voxels in a layer of a 3-D object map. That is, the addressable location can be a plurality of voxels of the 3-D object map that correspond to a portion of the build area.

The agent calibration manager 354 can convert the 3-D object model to a plurality of modeled energy quantities represented in a 3-D object model energy map. The agent calibration manager 354 can convert the solid geometry of each addressable location of a 3-D object map to a target quantity of energy to be delivered and/or absorbed by a build material at the location to manufacture the solid geometry of the 3-D object in the build area. The agent calibration manager 354 can convert the 3-D object model by taking incoming pixel values (e.g., values corresponding to a quantity of energy absorbing material to be applied in a physical location of the build area according to the 3-D object model) and convert those values to modeled energy quantities based on a pre-determined formula for competing such conversions.

The agent calibration manager 354 can determine an amount of energy absorbed by a build material treated with a plurality of different quantities of a printing agent(s) (e.g., an energy absorbing fusing agent, an energy absorption retarding agent, a moderating printing agent that modifies a degree of coalescence of the build material, etc.). The agent calibration manager 354 can make such determinations by collecting measurements directly or indirectly of energy absorbed by different quantities of printing agent(s) at portions of the build area.

For example, the agent calibration manager 354 can determine an amount of energy that a portion of the build area receives using a direct feedback device such as an infrared (IR) camera and/or scanning IR temperature sensor. These devices can be on board the additive manufacturing device and can measure the temperature and/or amount of radiation being emitted and/or absorbed in a particular area treated with various amounts of printing agent(s). The amount of energy that a portion of a build area receives can be determined based on these measurements.

Additionally, the agent calibration manager 354 can determine the amount of energy that a portion of the build area receives utilizing measurements of test objects additively manufactured within that portion of the build area treated with various quantities of printing agent(s). Small test objects can be additively manufactured in an array over the whole build area and the objects can thereafter be evaluated (e.g., analyzed by sensors, etc.). The evaluation can be performed on-board the additive manufacturing device or performed using a separate or ancillary device. The evaluation can include: collecting measurements with corresponding sensors of the extent of coalescence and/or solidification of the objects, the internal feature (e.g., holes) size of the object, optical density of the object, surface finish of the object, the temperature that objects reach while being built, the weight of completed objects of known volume (e.g., the density), the darkness/color of the objects (e.g., a measure of the scattering due to incomplete melting), reflectivity of objects (e.g., an additional measure of scattering), a gloss or surface roughness of objects (e.g., a measure of flow leveling in the object surface, which is a function of viscosity which varies strongly with temperature), and various other measures of objects built with different quantities of printing agent(s).

The agent calibration manager 354 can also collect measurements of object properties of interest such as a yield strength, modulus, elongation, etc. of the object. The measurements of the test objects can be targeted toward determining if a test object manufactured at a portion of the build area was fully coalesced/solidified and/or received energy in excess of a certain threshold of energy involved in fully melting or solidifying a layer of the object. Various methods and mechanisms of measuring the test objects to determine these properties can be utilized. For example, such methods and mechanisms can be utilized as those disclosed in PCT Application No. PCT/US2014/032341 filed on Mar. 31, 2014, entitled "GENERATING A THREE-DIMENSIONAL OBJECT," the entire contents of which are hereby incorporated herein by reference. The measurements of the test objects can measure properties that are a function of the energy received at the portion of the build area where the object was manufactured. The agent calibration manager 354 can determine an amount of energy received/absorbed at a location of the build area based on the measurements.

The agent calibration manager 354 can determine a relationship between an amount of energy absorbed by an area of build material and amount of printing agent treating the area of build material. Determining the relationship can include generating a graph for each addressable location of the build area describing the amount of energy absorbed at that location upon treatment with a particular quantity of printing agent(s). Additionally, determining the relationship can include determining a peak net absorption point for each of a plurality of locations of the build area. Determining a peak net absorption point can include determining, based on the above listed measurements, a quantity of printing agent(s) that provides a comparatively highest (e.g., maximal) energy absorption measurement with a comparatively least amount of printing agent(s). The maximal amount of energy absorption can be the peak net absorption printing agent quantity for the location past which application of further printing agent(s) (e.g., fusing agent, etc.) results in an identical and/or decreased energy absorption for the location and before which application of further printing agent(s) results in increased energy absorption for the location.

The agent calibration manager 354 can generate a calibration based on the measurements. For example, the agent calibration manager can construct a calibration curve. The calibration curve can be constructed by selecting equidistant measurement values as described above. The measurement values can represent a range of measurement values corresponding to measurements of a location treated with a range of printing agent(s) between no printing agent(s) and the quantity of printing agent(s) corresponding to a peak net absorption point for the location. The agent calibration manager 354 can interpolate a curve fit to the measured values for test objects built with the different quantities of printing agent(s) to determine the quantities of printing agent(s) corresponding to each of the measured energy absorption values for a location.

The agent calibration manager 354 can store the interpolated curve and/or the corresponding printing agent/energy absorption values at each location in a calibration table. The calibration table can include a lookup table providing per location definitions of a quantity of printing agent(s) corresponding to a quantity of energy absorbed by the build material.

The agent calibration manager 354 can determine the inverse function corresponding to the interpolated curve. The inverse function can be converted into an algebraic function such as a polynomial function. The polynomial function can be used as a calibration function. A calibration function can be an expression of a mathematical operation applicable to modeled energy values from a 3-D object model to adjust quantities of printing agent(s) corresponding to each one.

The agent calibration manger 354 can apply the calibration. Applying the calibration can include converting a portion of a 3-D object model to a calibrated quantity of printing agent(s) to be applied to the build area. The 3-D object model can include a number of elements corresponding to structure of a 3-D object and/or locations on a build area of an additive manufacturing device where the 3-D object can be created. These elements can be converted to modeled energy quantities as described above. Upon conversion, the 3-D object model can represent a modeled energy quantity associated with each element (e.g., a per-element energy value) corresponding to structure of a 3-D object and/or locations on a build area. Applying the calibration can include replacing, adjusting, and/or transforming these per element energy values according to the calibration.

For example, the per-element energy values can be transformed into quantities of printing agent(s) to be applied to a build area based on the calibration. In an example, the per-element energy value can be replaced by looking up the per-element energy value in a calibration table generated based on the calibration. The calibration table can described quantities of printing agent(s) applied to a location corresponding to quantities of energy received and/or absorbed at the location based on the measurement values collected at the location. The calibration table can be constructed based on the curve fit to the measured values of test objects built with different quantities of printing agent(s). Replacing the per-element energy value can include replacing the per-element energy value with a quantity of printing agent to be printed at the corresponding location, where the quantity of printing agent(s) is the quantity of printing agent(s) corresponding to the per-element energy value stored in the calibration table.

In an example, the per-element energy values can be mathematically adjusted and/or transformed by applying a calibration function to the per-element energy value. The calibration function can include the polynomial function based on the inverse function derived from the curve fit to the measured values of test objects built with different quantities of printing agent(s). The calibration function can transform the per-element energy value into a corresponding quantity of printing agent(s) to be applied to the location.

The result of the conversion can include the output 356. The output 356 can include a calibrated 3-D object model generated based on the conversion. The calibrated 3-D object model can be a model of the targeted physical structure of a 3-D object to additively manufacture. That is, the calibrated 3-D object model can be a graphical and/or mathematical representation suitable to additively manufacture a physical replica of the 3-D object (e.g., via a 3-D printer). The calibrated 3-D object model can be a distinct solid from the input 352, whose elements represent the quantity of printing agent(s) to be applied to build material at corresponding locations of the build area to additively manufacture the 3-D object being modeled.

Additional adjustments can be applied to the per-element energy values and/or the quantities of printing agent(s) to be applied to corresponding locations of the build area to additively manufacture the 3-D object. The additional adjustment can be an adjustment to correct for spatial variation in delivered and/or absorbed energy across a build area. Spatial variation in delivered and/or absorbed energy can include differences among two portions of a build area in the quantity of energy received and/or absorbed by build material upon those portions of the build area of an additive manufacturing device. These differences can be due to non-uniformity in the properties of the additive manufacturing device.

The spatial variation in delivered and/or absorbed energy across a build area can be determined based on measurements of the properties of the additive manufacturing device, the build area of the additive manufacturing device, 3-D test objects created in the additive manufacturing device, the 3-D object being manufactured, etc. For example, variations in the uniformity of radiation emitted from lamps and/or a temperature control system can result in variations in the temperature among different portions of the build area. In another example, variations in the uniformity of radiation emitted from lamps and/or temperature control systems can result in variations in the extent of coalescence and/or solidification reflected in varying measurements of the properties of test objects manufactured in different portions of the build area.

The average of delivered and/or absorbed energy across a plurality of locations (e.g., each addressable location of the entire build area, each addressable location of a portion of the build area, etc.) of the build area can be determined. The ratio of the average of delivered and/or absorbed energy across a plurality of locations to the per-element energy value of a particular location of the plurality of locations can be used as a scalar value to multiply the per-element energy value prior to applying the calibration table and/or the calibration function. The result of the additional correction can be an output 356. The output 356 can include an adjusted calibrated 3-D object model generated based on the adjustment and the conversion. The adjusted calibrated 3-D object model can be a distinct solid from the input 352, whose elements represent the quantity of printing agent(s), adjusted for spatial energy variation, to be applied to corresponding locations of the build area to additively manufacture the 3-D object being modeled.

The additional adjustment can also be an adjustment to correct for spatial variation in delivered printing agent(s) quantity across a build area. Spatial variation in delivered printing agent(s) quantity can include differences among two portions of a build area in the quantity and/or application pattern of printing agent(s) applied to build material upon those portions of the build area of an additive manufacturing device. These differences can be due to non-uniformity in the properties of the additive manufacturing device including the printheads and/or printhead nozzles that dispense printing agent(s). For example, in a comparatively larger and/or page wide nozzle array particular nozzles and/or groups of nozzles can be used to print upon particular regions (e.g., image rows) of the build area and the particular nozzles and/or groups of nozzles can have differing drop weights as compared to others in the additive manufacturing device.

The spatial variation in delivered printing agent(s) quantity can be determined based on measurements of the printhead nozzles, the drops of printing agent(s) ejected from the nozzles, and/or the ejected printing agent(s) from the nozzles. For example, the spatial variation in delivered printing agent(s) quantity can be determined based on measurements of drop weight, drop size, optical density, etc. of a printing agent(s) ejected from a number of nozzles. The measurements can be spatially related to portions of the build area of the additive manufacturing device by determining which nozzles eject printing agent(s) onto which portions of the build area of the additive manufacturing device. The average of quantity and/or application pattern of printing agent(s) applied across a plurality of locations (e.g., each addressable location of the entire build area, each addressable location of a portion of the build area, etc.) of the build area can be determined.

The ratio of the average of quantity and/or application pattern of printing agent(s) applied across a plurality of locations to the quantity of printing agent(s) to be applied to a particular location of the build area to additively manufacture the 3-D object being modeled according to the applied calibration can be used as a scalar value to multiply the quantity of printing agent(s) to be applied to the location to correct for drop weight variation. For example, after the per-element energy value for a location has been transformed to a quantity of printing agent(s) to apply to the location based on the calibration table, the resulting quantity of printing agent(s) can be multiplied by the scalar value. In another example, after the per-element energy value for a location has been transformed, via its application to the calibration function, to a quantity of printing agent to apply to the location, the resulting quantity of printing agent(s) can be multiplied by the scalar value. The result of the additional correction can be an output 356. The output 356 can include an adjusted calibrated 3-D object model generated based on the adjustment and the conversion. The adjusted calibrated 3-D object model can be a distinct solid from the input 352, whose elements represent the quantity of printing agent(s), adjusted for spatial variation in delivered printing agent(s), to be applied to corresponding locations of the build area to additively manufacture the 3-D object being modeled.

Calibration and/or adjustment of the printing agent(s) can result in delivery of a more consistent amount of energy across the surface of the build area by compensating for spatial energy variations and/or physical printhead/nozzle delivered volume variation through software rather than by adding more expensive hardware. Calibration and adjustment of the printing agent(s) as described can simplify the conversion of object geometry to device-appropriate and location/appropriate quantities of printing agent(s) to provide a flexible conversion method. Additionally, calibration and/or adjustment of the printing agent(s) can generate more consistent and accurate 3-D object geometry and object part properties.

Calibration and/or adjustment of the printing agent(s) can be utilized in generating and/or executing 3-D printing (e.g., additive manufacturing) instructions for a 3-D printing operation (e.g., depositing build material, applying printing agent, applying energy to the build area, selectively melting and solidifying the building agent in the build area, indexing and creating a successive layer of a 3-D object by repeating the process, etc.). The calibration and/or adjustment of the printing agent(s) can occur while performing a 3-D printing operation. That is, calibrating and/or adjusting of the printing agent(s) can occur in substantially real-time during the 3-D printing operation and the measurements can be measurements captured in substantially real-time during the operation. Alternatively, calibrating and/or adjusting of the printing agent(s) can occur prior to performing the 3-D printing operation.

Figure 4:
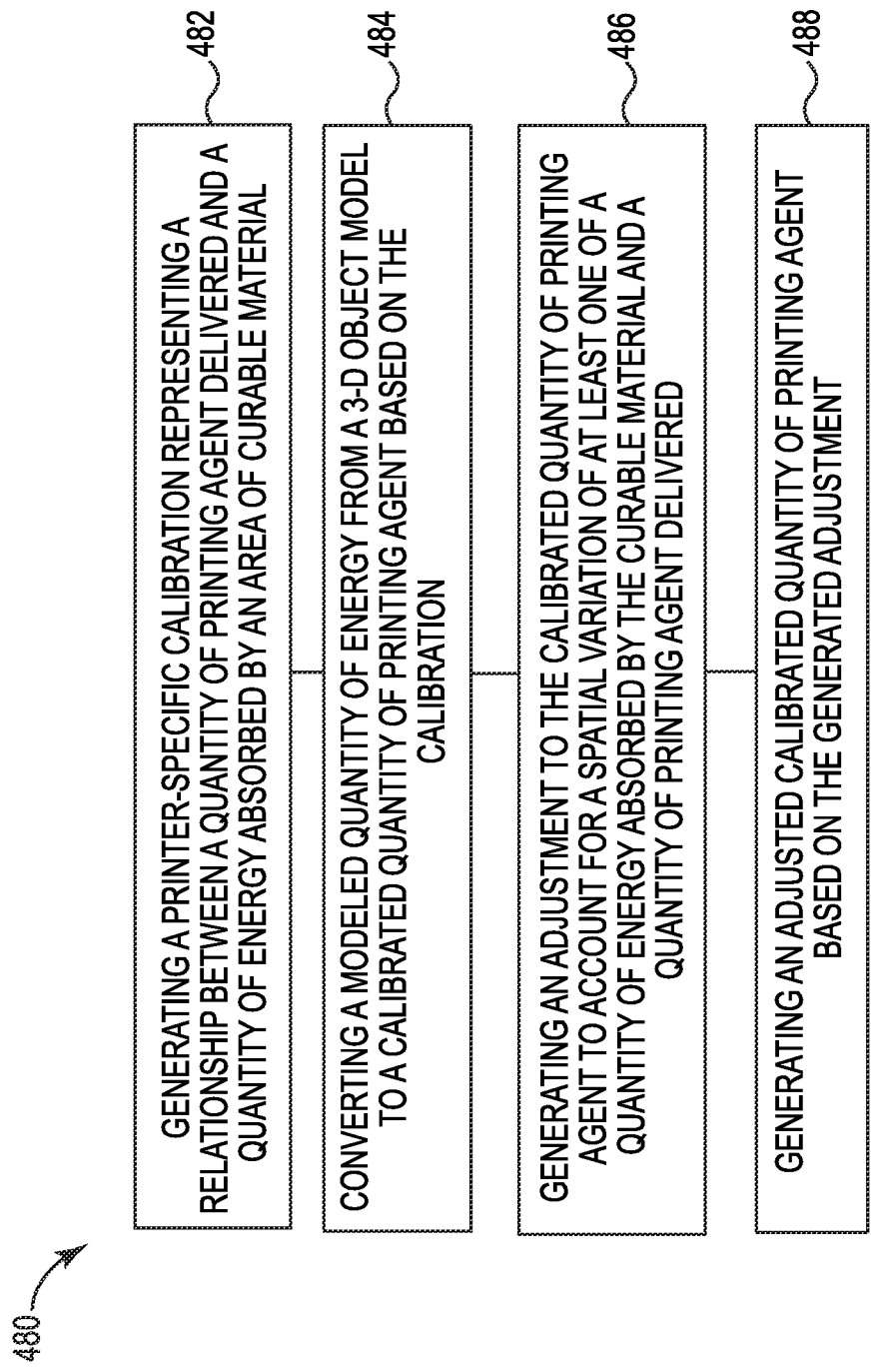
FIG. 4 illustrates a flow chart of an example of a method of agent calibration according to the present disclosure.

FIG. 4 illustrates a flow chart of an example of a method 480 of printing agent calibration for a three-dimensional (3-D) printing, The method 480 can generate, from a series of determined quantities of energy absorbed by a build material treated with different quantities of a printing agent, a printer-specific calibration representing a relationship between a quantity of printing agent delivered and a quantity of energy absorbed by an area of build material; convert a modeled quantity of energy from a 3-D object model to a calibrated quantity of printing agent based on the calibration; generate an adjustment to the calibrated quantity of printing agent to account for a spatial variation of at least one of a quantity of energy absorbed by the build material and a quantity of printing agent delivered across a build area of the 3-D printer; and generate an adjusted calibrated quantity of printing agent based on the generated adjustment. In some examples, the method 480 can be performed utilizing a system (e.g., system 100 as referenced in FIG. 1) and/or a computing device (e.g., computing device 220 as referenced in FIG. 2).

As illustrated at 482, the method 480 can include generating, from a series of determined quantities of energy absorbed by a build material treated with different quantities of a printing agent, a printer-specific calibration. A printer specific calibration can be a mathematical representation of a relationship between a quantity of printing agent delivered and a quantity of energy absorbed by an area of build material. The determined quantities of energy absorbed by a build material treated with different quantities of a printing agent can be determined from measurements taken of the build area of the 3-D printer and/or of test objects created in the build area.

As illustrated at 484, the method 480 can include converting a modeled quantity of energy from a 3-D object model to a calibrated quantity of printing agent based on the calibration. A 3-D object model can be converted to a plurality of modeled energy quantities represented in a 3-D object model energy map. The solid geometry of each addressable location of a 3-D object map can be converted to a targeted quantity of energy (e.g., modeled energy quantity) to be delivered and/or absorbed by a build material at the location to manufacture the solid geometry of the 3-D object in the build area. The modeled energy quantity can be converted to a calibrated quantity of printing agent by applying the calibration (e.g., selecting a replacement value from a calibration table, applying a calibration function, etc.) to the modeled energy quantity. The result of the application of the calibration to the modeled energy quantity can be a quantity of printing agent to be applied in the corresponding location to manufacture the 3-D object (e.g., the calibrated quantity of printing agent).

As illustrated at 486, the method 480 can include generating an adjustment to the calibrated quantity of printing agent to account for a spatial variation of at least one of a quantity of energy absorbed by the build material and a quantity of printing agent delivered across a build area of the 3-D printer. Generating an adjustment to the calibrated quantity of printing agent to account for a spatial variation of a quantity of energy absorbed by the build material can include generating an adjustment to the calibrated quantity of printing agent based on spatial variation of in measurements of the temperature among different portions of the build area and/or variations in the extent of coalescing and/or solidifying the build material as reflected in varying measurements of the properties of test objects manufactured in different portions of the build area. In an example, generating the adjustment to the calibrated quantity of printing agent to account for the spatial variation of the energy absorbed by the build material can include adjusting the modeled quantity of energy from the 3-D object model by a scalar value derived from a temperature variation across the build area.

Generating an adjustment to the calibrated quantity of printing agent to account for a spatial variation of a quantity of printing agent delivered across a build area material can include generating an adjustment to the calibrated quantity of printing agent based on spatial variation of in measurements of drop weight (e.g., drop size, optical density, etc.). In an example, generating the adjustment to the calibrated quantity of printing agent to account for the spatial variation of the quantity of printing agent delivered across a build area can include adjusting the calibrated quantity of printing agent by a scalar value derived from a drop weight variation among a plurality of printing agent dispensing nozzles.

As illustrated at 488, the method 480 can include generating an adjusted calibrated quantity of printing agent based on the generated adjustment. Generating the adjusted calibrated quantity of printing agent based on the generated adjustment can include applying the scalar value derived from a temperature variation across the build area to the corresponding modeled energy quantity prior to application of the calibration. Generating the adjusted calibrated quantity of printing agent can also include applying the scalar value derived from a drop weight variation among a plurality of printing agent dispensing nozzles to the calibrated quantity of printing agent resulting from application of the calibration to the corresponding modeled energy quantity.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The figures herein follow a numbering convention in which the first digit or digits correspond to the drawing figure number and the remaining digits identify an element or component in the drawing. As will be appreciated, elements shown in the various examples herein can be added, exchanged, and/or eliminated so as to provide a number of additional examples of the present disclosure. In addition, as will be appreciated, the proportion and the relative scale of the elements provided in the figures are intended to illustrate certain examples of the present disclosure, and should not be taken in a limiting sense.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system for agent calibration, comprising:
a determine engine to determine a quantity of energy absorbed by a build material treated with a plurality of different quantities of a printing agent at a location of a build area;
a generate engine to generate a calibration relating a particular quantity of the printing agent as a calibrated quantity of printing agent to the determined quantity of energy; and,
a convert engine to convert a portion of a three-dimensional (3-D) object model corresponding to the location, to the calibrated quantity of printing agent with which to treat the location to additively manufacture the portion of the three-dimensional (3-D) object model based on the calibration.

2. The system of claim 1, wherein to generate the calibration includes to determine a particular quantity of printing agent per an area of the build material that corresponds to a target quantity of energy absorbed by the area of build material.

3. The system of claim 2, wherein the calibration includes a curve interpolated from the determined quantity of energy absorbed by the build material treated with various quantities of the plurality of quantities of printing agent between zero printing agent and the particular quantity of printing agent.

4. The system of claim 2, wherein the calibration includes a calibration table characterizing a calibrated quantity of printing agent per an area of build material to produce a quantity of energy absorption at the location.

5. The system of claim 1, further comprising a model engine to covert a solid geometry of the 3-D object model to a modeled energy quantity.

6. The system of claim 5, wherein the calibration includes a polynomial calibrating function applicable to the assigned modeled energy quantity associated with the portion of a three-dimensional (3-D) object model.

7. A non-transitory computer readable medium storing instructions executable by a processing resource to cause a computer to:
determine, for a build area of a three-dimensional printer, a relationship between a quantity of energy absorbed by an area of build material and a quantity of a printing agent treating the area of build material;
generate a calibration to convert a modeled quantity of energy to a calibrated quantity of printing agent based on the relationship; and
convert, based on the calibration, a plurality of modeled energy quantities represented in a three-dimensional object model into corresponding quantities of printing agent to be applied to the build area.

8. The non-transitory computer readable medium of claim 7, wherein the calibration can adjust the quantity of printing agent to be applied to a portion of the build area to correct for a spatial variation in the quantity of energy absorbed by the area of build material in that portion of the build area.

9. The non-transitory computer readable medium of claim 8, wherein the spatial variation in the quantity of energy absorbed by the area of build material is identified based on a measurement of temperature variation across portions of the build area.

10. The non-transitory computer readable medium of claim 8, wherein the spatial variation in the quantity of energy absorbed by the area of build material is identified based on a measurement of physical property variation among test objects across portions of the build area.

11. The non-transitory computer readable medium of claim 7, wherein the calibration can adjust the quantity of printing agent to be applied to a portion of the build area to correct for a spatial variation in the quantity of delivered printing agent in that portion of the build area.

12. The non-transitory computer readable medium of claim 11, wherein the spatial variation in the quantity of delivered printing agent in that portion of the build area is determined by measuring a drop weight variation across portions of the build area.

* * * * *